United States Patent [19]

Yamanoi et al.

[11] Patent Number: 5,037,577

[45] Date of Patent: Aug. 6, 1991

[54] METHOD FOR PRODUCING YTTRIUM-ALUMINUM-GARNET FINE PARTICLES AND YTTRIUM-ALUMINUM-GARNET BASE PHOSPHOR FINE PARTICLES

[75] Inventors: Hiroshi Yamanoi; Satoru Uedaira, both of Kanagawa, Japan

[73] Assignee: Sony Corporation, Tokyo, Japan

[21] Appl. No.: 384,660

[22] Filed: Jul. 24, 1989

[30] Foreign Application Priority Data

Jul. 30, 1988 [JP] Japan ................................. 63-191472

[51] Int. Cl.$^5$ ........................ C09K 11/80; C01F 7/02; C01F 17/00
[52] U.S. Cl. ............................. 252/301.4 R; 423/263; 423/600
[58] Field of Search ................ 252/301.4 R; 423/263, 423/600

[56] References Cited

U.S. PATENT DOCUMENTS 3,496,108 2/1970 Kolb et al. .......................... 423/263
4,180,477 12/1979 Barmes .......................... 252/301.4 R

FOREIGN PATENT DOCUMENTS 2032450 5/1980 United Kingdom ......... 252/301.4 R
2149416 6/1985 United Kingdom ......... 252/301.4 R

*Primary Examiner*—Jack Cooper
*Attorney, Agent, or Firm*—Hill, Van Santen, Steadman & Simpson

[57] ABSTRACT

A method of producing fine, single-phase YAG particles and fine, single-phase YAG phosphor particles. The method includes subjecting yttrium and aluminum solubilized in an aqueous alkaline solution to a heating reaction at not lower than a predetermined temperature to produce the fine single-phase YAG particles having a uniform particle size distribution. The method also includes adding terbium solubilized in an aqueous alkaline solution as an activating element to the solution of yttrium and aluminum and subjecting this solution to a heating section to produce fine single-phase YAG phosphor particles having a uniform particle size distribution.

11 Claims, 6 Drawing Sheets

METHOD FOR PRODUCING YTTRIUM-ALUMINUM-GARNET FINE PARTICLES AND YTTRIUM-ALUMINUM-GARNET BASE PHOSPHOR FINE PARTICLES

BACKGROUND OF THE INVENTION

1. Field of the Invention

The present relates to the method for producing yttrium-aluminum-garnet material, which hereinafter is referred to as YAG or YAG material, and to a YAG base phosphor fine particles activated with terbium.

2. Description of the Prior Art

YAG is an oxide having the compositional formula of $Y_3Al_5O_{12}$ and finds its application as the starting material for a laser oscillator element or as an artificial jewel. The YAG solid solution system in which yttrium is partially replaced by terbium turns out to be a phosphor or luminophor material represented by the compositional formula $Tb_xY_{3-x}Al_5O_{12}$ where x denotes a number less than three and indicates the amount of substitution. The YAG material with terbium is known to emit fluorescence efficiently when $x \geq 0.15$. This material has a high light emission saturation level and is suited for a high luminosity phosphor screen such as that for a projection type television receiver, beam index tube or a display for an aircraft instrumentation system.

Among the factors influencing the properties of the YAG base phosphor materials are the particle size, uniformity, dispersibility and purity. Since it is thought that by optimizing these factors a cathode ray tube having a fine phosphor pattern, such as that for the recently developed high definition television system, may be produced with high resolution and high image quality, studies are being conduced of the YAG base material as a promising phosphor material.

The YAG material and the YAG base phosphor material may be synthesized by an essentially identical procedure.

One of the representative methods for synthesizing the YAG materials is a method consisting of the steps of crushing and mixing yttrium oxide and aluminum oxide in a ball mill along with a sintering assisting agent to form a mixture; subjecting the mixture to a solid-phase reaction for a predetermined time at an elevated temperature of 1500° C to form a reaction product; and then crushing the reaction product to a fine particle size by a ball mill and classifying by a sieve. An improved method is essentially similar to the above method except that a flux is added during the aforementioned solid phase reaction to reduce the physical strain applied to the YAG fine particles.

For producing the YAG base phosphor material, the operation similar to that described above is performed, however, with an addition of terbium oxide to the aforementioned yttrium oxide and aluminum oxide during the crushing and mixing step.

However, in these conventional methods, the reaction product from the slid phase reaction is crushed in a ball mill to a fine particle size, the produced YAG fine particles or YAG base phosphor fine particles have a wide particle size distribution of 2 to 30 microns, so that coarse size particles are unavoidably included in the produced particulate material. On the other hand, since a prolonged time is involved in the ball-milling operation, impurities, such as metal oxides, tend to be mixed into the particulate material. There is a certain limitation in particle size reduction even with the use of the flux, such that it is usually difficult to produce particles having the particle size of less than 10 μm.

On account of these problems, inconveniences, such as the deteriorated energy conversion efficiency, unnecessary coloration and/or the lowered resolution may be invited when above all the YAG base phosphor fine particles are applied to, for example, a high definition television system.

SUMMARY OF THE INVENTION

It is therefore an object to overcome the above problems and to provide a method for producing YAG fine particles and YAG base phosphor fine particles that are fine in particle size, that are of higher purity and that have a narrower particle size distribution.

The present inventors have conducted eager researches and investigations for accomplishing the above object, and found that, by subjecting yttrium and aluminum solubilized in an aqueous alkaline solution to a heating reaction at higher than a predetermined temperature, it is possible to produce fine YAG particles of a uniform particle size distribution as a single phase.

The present inventors have also found that, by adding terbium solubilized in an aqueous alkaline solution as an activator element to yttrium and aluminum, it is possible to produce fine YAG base phosphor particles of a uniform particle size distribution as a single phase by the operation similar to that described above.

Thus, the present invention provides a method for producing yttrium-aluminum-garnet fine particles comprising the steps of reacting first material selected from a group consisting of yttrium salts and hydrolyzate of yttrium compounds and a second material selected from a group consisting of aluminum salts and hydrolyzates of aluminum compounds in an aqueous alkaline solution having a pH value of not less than 10.0 and at a reaction temperature of not lower than 270° C.

The present invention also provides a method for producing yttrium-aluminum-garnet base phosphor fine particles comprising reacting a first material selected from a group consisting of yttrium salts and hydrolyzates of yttrium compounds, a second material selected from a group consisting of aluminum salts and hydrolyzates of aluminum compounds and a third material selected from a group consisting of terbium salts and hydrolyzates of terbium in an aqueous alkaline solution having a pH value of not less than 10.0 and at a reaction temperature of not lower than 270° C.

In distinction from the prior art method consisting of a combination of solid phase synthesis and physical pulverization, it is possible with the present invention to produce the YAG fine particles or YAG base phosphor fine particles with a narrow particle size distribution by liquid phase synthesis at a higher yield rate. In addition, a quicker reaction may be performed at a temperature significantly lower than that used in the solid phase reaction. Also, a prolonged physical crushing need not be performed, such as by a ball mill, so that the metal oxides may be prevented from being introduced into the mixture and YAG fine particles or YAG base phosphor fine particles of a higher purity may be produced.

DESCRIPTION OF THE PREFERRED EMBODIMENTS

According to the present invention, since the YAG fine particles and YAG base phosphor fine particles are produced by the liquid phase reaction in an aqueous solution system, it is necessary for yttrium, aluminum and terbium as the starting materials to be also solubilized. For this reason, hydrolyzates of the compounds containing these elements or salts of these elements are employed.

For producing these hydrolyzates, it suffices to dissolve halogenides or various salts as later described of yttrium, aluminum or terbium in water or to hydrolyze aqueous solutions thereof in an aqueous alkaline solution such as LiOH, NaOH, KOH or $NH_4OH$.

The above salts may include salts of oxoacids, such as nitrates or sulfates or of organic acids, such as acetates.

As the alkaline solution for dissolving the above starting materials, aqueous solutions of hydroxides of alkali metals, such as Li, Na or K are employed.

In the reaction of the present invention, it is necessary to suitably select the pH and the reaction temperature.

The pH is selected to be not lower than 10.0. With the pH less than 10.0, the single phase cannot be achieved sufficiently and the purity becomes insufficient. This purity may be ascertained by X-ray diffraction. In the case of the YAG fine particles, the preferred pH range is 10.0 to 13.3 and, with a more preferred pH range of 11.0 to 12.6, a single phase product may be obtained at a high yield rate. In the case of the YAG base phosphor fine particles, the preferred pH range is 10.2 to 14.1 and, with a more preferred pH range of 11.0 to 13.5, a single phase product may be obtained at a high yield rate. Since the pH influences the particle size of the produced YAG fine particles and YAG base phosphor fine particles, it need be set suitably depending on the desired properties.

On the other hand, the temperature not lower than 270° C. is employed. With the temperature lower than 270° C., the intensity of the X-ray diffraction ascribable to products other than the desired product becomes higher while the purity is lowered. For reducing the reaction time and realizing more efficient synthesis, the temperature of not lower than 300° C. is more preferred. Although there is no limitation to the temperature upper limit, it is set to about 380° C. in consideration of the critical vapor pressure of the reaction system.

It will be noted that the reaction time interval is not shorter than 5 minutes and, preferably, not less than 10 minutes.

After termination of the reaction, the YAG fine particles or YAG base phosphor fine particles, obtained as precipitates, are washed with cold or lukewarm water by decantation, centrifugation or filtration. The metal ions in the alkaline solution, such as Li, Na, K ions, adsorbed to the precipitates, are removed in this manner, and the remaining product is then dried.

It will be noted that the YAG base phosphor fine particles of the present invention may be admixed further with Ga for improving the brightness or luminance.

It will be seen from the foregoing that the YAG fine particles and YAG base phosphor fine particles obtained in accordance with the present invention are extremely small in particle size and uniform in particle size distribution, while having such advantages that the particle size may be controlled by the pH of the reaction solution and that there is no risk of mixing in metal oxides in the course of the production process. The YAG base phosphor fine particles having these advantages are highly effective when used as the phosphor for the CRT for which high resolution is a requirement.

The present invention will be hereinafter explained with reference to illustrative Examples and by having reference to the drawings.

EXAMPLE 1

The present Example is concerned with preparation of YAG fine particles from yttrium nitrate, $Y(NO_3)_3 \cdot 3.5H_2O$, and aluminum chloride, $AlCl_3 \cdot 6H_2O$.

First, 6.34 g of yttrium nitrate, $Y(NO_3)_3 \cdot 3.5H_2O$, and 11.3 g of aluminum chloride, $AlCl_3 \cdot 6H_2O$, were dissolved in 40 ml of pure water to produce a solution B into which the solution A was added slowly dropwise with agitation so as to avoid gelation. The resulting system was further admixed with pure water to produce 100 ml of a reaction solution C. The pH value of the reaction solution C was adjusted by controlling the addition of an amount of sodium hydroxide.

The reaction solution C was charged into an autoclave fitted with a platinum inner container and reacted with agitation at 360° C. for one hour. After termination of the reaction, decantation was repeatedly performed with pure water to remove alkali metal ions from the white-colored precipitates produced during the above reaction. The resulting mass was subjected to filtration and washing with water and dried overnight at 100° C. in a dryer to produce a white-colored solid product.

Figure 1:
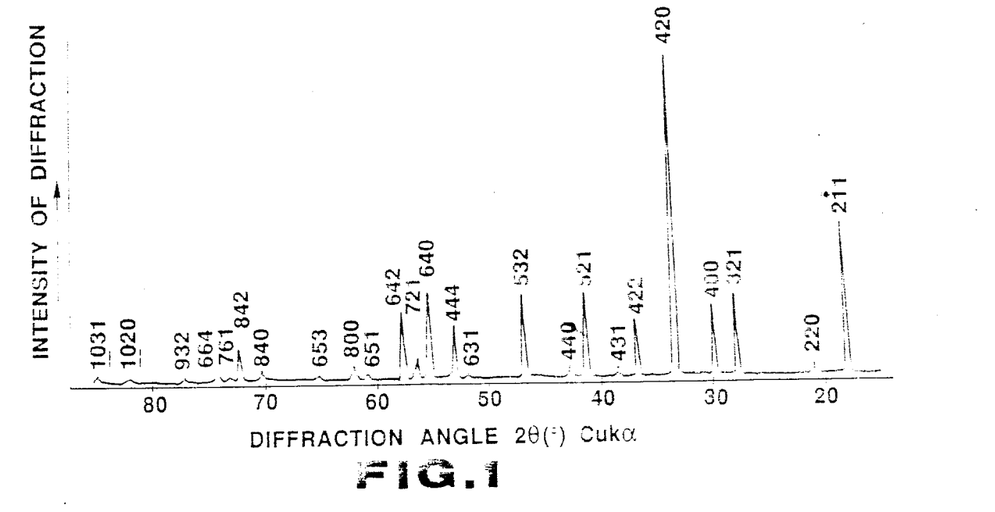
FIG. 1 is a diagram showing an X-ray diffraction pattern of YAG fine particles produced in accordance with the present invention.

The white-colored solid product obtained with the pH value of the reaction solution C of 12.3 was subjected to an X-ray diffraction using CuKα rays. The results are shown in FIG. 1, in which the ordinate and the abscissa denote the intensity of diffraction by arbitrary units and the diffraction angle $2\theta(°)$, respectively, since the X-ray diffraction pattern coincides with the cards 33-40 of JCPDS (Joint Committee on Powder Diffraction Standards), the product could be identified to be the cubic crystal YAG ($Y_3Al_5O_{12}$).

Figure 2:
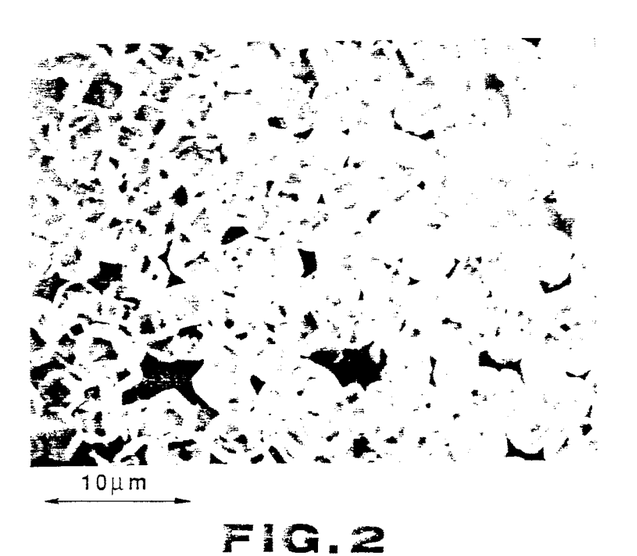
FIG. 2 is a photomicrograph taken with a scanning type electronic microscope of YAG fine particles produced in accordance with the present invention.

FIG. 2 shows the photomicrograph of the white-colored solid product, which was taken with a scanning type electron microscope. It is seen from this Figure that there have been produced YAG fine particles that are 2 to 3μm in particle size and extremely uniform in particle size.

Then, for optimizing the conditions for preparation of the YAG fine particles, an investigation was made of the changes in the results due to changes in the pH value of the reaction solution C, changes in the reaction temperature and changes in the reaction time interval.

Figure 3:
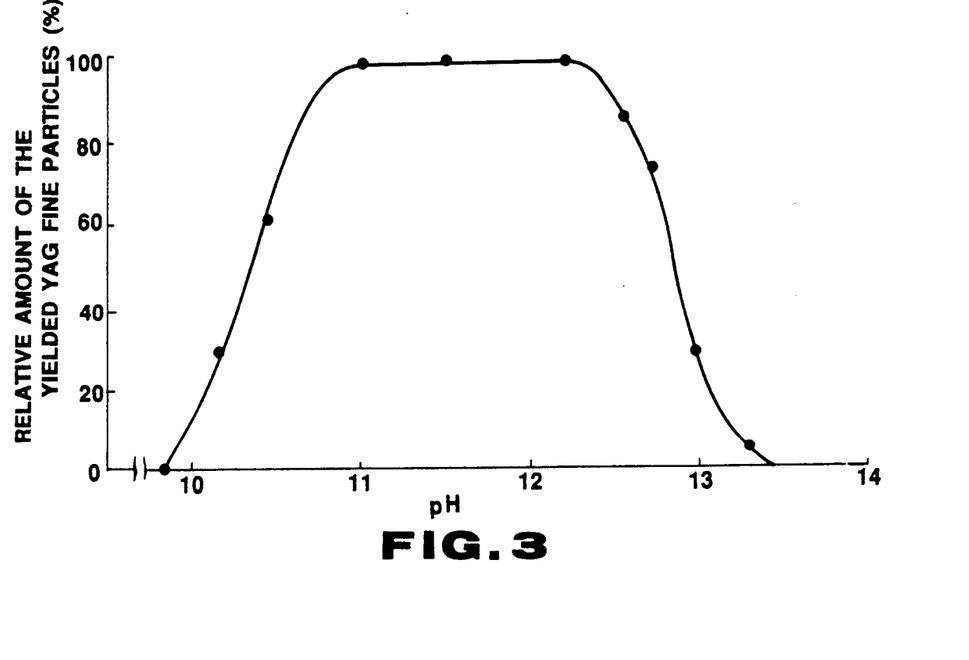
FIG. 3 is a diagram showing the amount of the yielded YAG fine particles in relation to the pH of the solution.

First, the pH dependency was examined in the following manner. The pH values of the reaction solution C were changed widely by changing the amount of sodium hydroxide employed and the reaction was performed for each product. The X-ray diffraction was then performed of each white-colored solid product to find the relative yield of YAG as the area of a peak corresponding to the diffraction from the (420) plane, which was then plotted against pH. The results are shown in FIG. 3, in which the ordinate and the abscissa indicate the relative yield of YAG in percentage (%) and the pH value of the reaction solution, respectively. It is seen from this Figure that YAG is produced in the pH range of 10.0 to 13.3 and at a higher yield rate in the pH range of 11.0 to 12.6.

Figure 4:
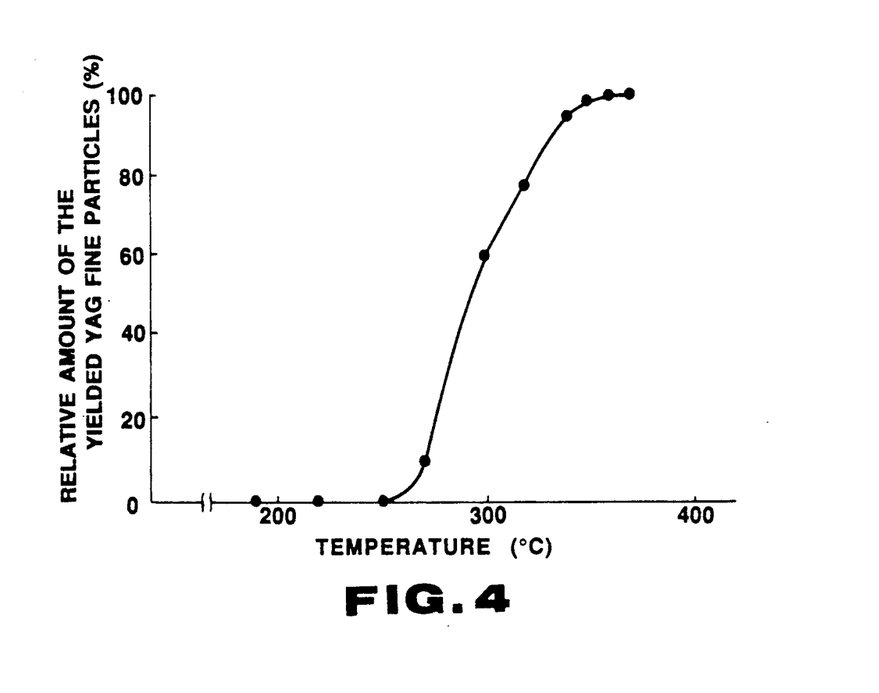
FIG. 4 is a diagram showing the amount of the yielded YAG fine particles in relation to the reaction temperature.

The temperature dependency was examined in the following manner. With the pH value of the reaction solution set to 12.3, the reaction was carried out for one hour with various reaction temperatures. Each produced white-colored solid product was subjected to X-ray diffraction to find similarly the relative yield of YAG which was then plotted against the reaction temperature. The results are shown in FIG. 4, in which the ordinate and the abscissa denote the relative yield of YAG in percentage (%) and the reaction temperature (° C), respectively. It is seen from this Figure that YAG is produced at a temperature of not lower than 270° C. and that the reaction proceeds most efficiently at about 360° C.

Figure 5:
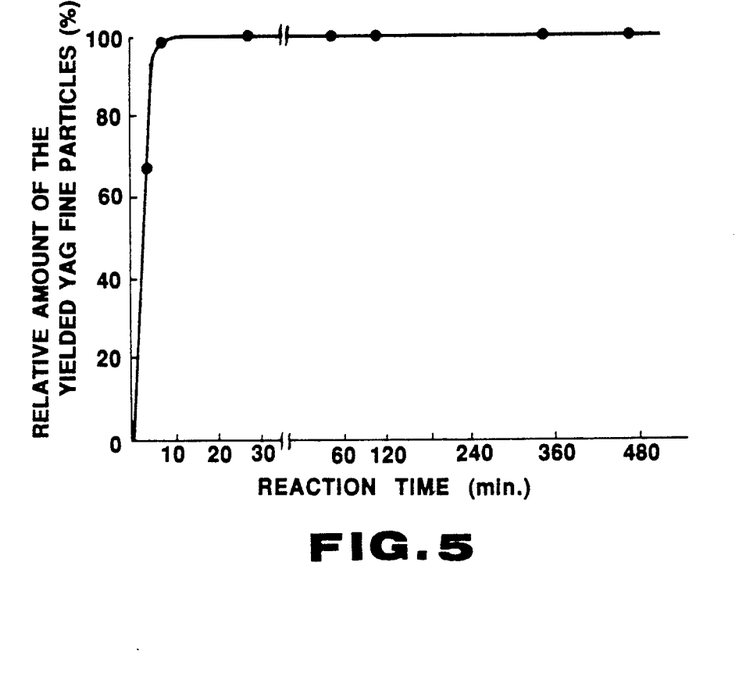
FIG. 5 is a diagram showing the amount of the yielded YAG fine particles in relation to the reaction time interval.

Finally, the reaction time interval was examined in the following manner. With the pH value of the reaction solution C of 12.3 and with the reaction temperature of 360° C, the reaction was carried out for various reaction time intervals. Each white-colored solid product was subjected to X-ray diffraction to find similarly the relative yield amount of YAG which was then plotted against the reaction time. The results are shown in FIG. 5 in which the ordinate and the abscissa denote the relative yield amount of YAG in percentage and the reaction time interval in minutes, respectively. It is seen from this Figure that YAG starts to be yielded in several minutes since the start of the reaction and the yield amount reaches saturation in about ten minutes.

EXAMPLE 2

The present Example is concerned with the preparation of YAG fine particles from yttrium chloride, $YCl_3$, and aluminum chloride, $AlCl_3$.

First, 36.6 g of yttrium chloride and 62.5 g of aluminum chloride were dissolved in 400 ml of pure water to produce a solution A. This solution was then added slowly dropwise into 400 ml of an aqueous solution of sodium hydroxide with agitation to avoid gelation. Then, pure water was added to the reaction system to produce a reaction solution C. The pH value of the reaction solution C was 12.6.

This reaction solution C was charged into an autoclave having a platinum inner container and reacted for six hours with agitation at 360° C. After termination of the reaction, the white-colored precipitates produced in the above reaction were washed by decantation, filtration and washing with water and dried in a dryer at 100° C. for 12 hours to a white-colored solid product.

As a result of the X-ray diffraction and observation with an electron microscope, the white-colored product was identified to be YAG fine particles of high purity and fine uniform particle size.

EXAMPLE 3

This Example is concerned with the investigation of the change in results caused by the addition of aluminum to the reaction solution in the preparation of YAG fine particles from yttrium nitrate, $Y(NO_3)_3 \cdot 3.5H_2O$, and aluminum chloride, $AlCl_3 \cdot 6H_2O$.

First, 63.4 g of yttrium nitrate, $Y(NO_3)_3 \cdot 3.5H_2O$, and 75.4 g of aluminum chloride $AlCl_3 \cdot 6H_2O$, were dissolved in 400 ml of pure water to produce a solution A. This solution A was added slowly dropwise into 400 ml of an aqueous solution of sodium hydroxide with agitation to avoid gelation. The resulting solution was then divided into ten equal volume parts, into each of which aluminum chloride, $AlCl_3$, was added in amounts of 0 g, 7.54 g, 15.1 g, ..., 67.9 g, that is, in amounts sequentially increasing by 10% of the initial amount of $AlCl_3$, and pure water was further added to produce reaction solutions $C_0$ to $C_9$, each being 100 ml in capacity. Thus, the reaction solution $C_0$ contains a stoichiometrically required amount of aluminum and the solutions $C_1$ to $C_9$ contain aluminum in amounts of 10% to 90% in excess to the stoichiometrically required amount of aluminum. The pH value of each of these solutions was adjusted to 12.6 using aqueous solutions of sodium hydroxide.

The above reaction solutions $C_0$ to $C_9$ were charged each into an autoclave fitted with a platinum inner container, and reacted at 360° C. for one hour. After termination of the reaction, the white-colored precipitates produced in the course of the above reaction were washed by decantation, filtration and washing with water and dried in a dryer at 100° overnight to produce a white-colored product.

On analysis of the white-colored solid product by X-ray diffraction, the white-colored solid product obtained from the reaction solutions $C_3$ to $C_9$ showed approximately the same pattern as the X-ray diffraction pattern shown in FIG. 1 and, thus, could be identified to be the high-purity YAG. However, the X-ray diffraction pattern of the white-colored solid product synthesized from the solutions $C_0$ to $C_2$ showed peaks indicating the co-existence of yttrium hydroxide, $Y(OH)_3$. It is seen from this that an excess amount of aluminum by about 30% over the stoichiometrically necessary amount on the theoretical numbers of mols is required in the reaction with respect to yttrium.

EXAMPLE 4

In the present Example, an investigation has been made of changes in the particle size of the YAG fine particles by the change in pH of the reaction solution C in the preparation of YAG fine particles from yttrium nitrate, $Y(NO_3)_3 \cdot 3.5H_2O$, and aluminum chloride, $AlCl_3 \cdot 6H_2O$.

First, 25.3 g of yttrium nitrate, $Y(NO_3)_3 \cdot 3.5H_2O$, and 45.2 g of aluminum chloride, $AlCl_3 \cdot 6H_2O$, were dissolved in 160 ml of pure water to produce a solution A. This solution A was added gradually dropwise into 100 ml of an aqueous solution of sodium hydroxide with agitation to avoid gellation. Then, pure water was added to the system to produce 320 ml of a solution, which was then divided into four equal parts. Each of these partial solutions was raised to 100 ml by adding a solution of pure water and different amounts of sodium hydroxide. In this manner, the solutions $C_I$ to $C_{IV}$ having the pH values of 11.6, 12.3, 12.6 an 13.0 were produced.

Each of these solutions $C_I$ to $C_{IV}$ was charged into an autoclave having a platinum inner container and reacted with agitation at 360° C. for one hour. After termination of the reaction, the white-colored precipitates produced by the above reaction were washed by decantation, filtration and washing with water and dried overnight in a dryer at 100° C. to produce a white-colored solid product.

On analysis of the white-colored solid product by X-ray diffraction, the white-colored solid products obtained from the reaction solutions $C_I$ to $C_{IV}$ were found to be the high purity YAG, although they exhibited slightly different values of the diffraction strength.

An observation of these solid products with an electron microscope has revealed that the product obtained from the reaction solution $C_I$ having the pH value of 11.6 has a particle size of approximately 0.1 μm and the product obtained from the reaction solution $C_{IV}$ having the pH value of 13.0 has the particle size of approximately 10 μm and that the particle size can be controlled within the range of approximately 0.1 to 10μm through adjustment of the pH value.

EXAMPLE 5

The present Example is concerned with the preparation of the YAG base phosphor fine particles from yttrium nitrate, $Y(NO_3)_3 \cdot 3.5H_2O$, and terbium chloride, $TbCl_3$.

First, 19.7 q of sodium hydroxide was dissolved in pure water to produce 60 ml of an aqueous alkaline solution into which 12.04 g of yttrium nitrate, $Y(NO_3)_3 \cdot 3.5H_2O$; 22.61 g of aluminum chloride, $AlCl_3 \cdot 6H_2O$; and 0.497 g of terbium chloride, $TbCl_3$, were added gradually under agitation and pure water was further added to produce 100 ml of a reaction solution D.

This reaction solution was charged into an autoclave fitted with a platinum inner container and reacted with agitation at 370° C. for one hour. After termination of the reaction, decantation was repeatedly performed using pure water to remove alkali metal ions from the white-colored precipitates produced in the above reaction. The resulting product was subjected to further filtration and washing with water and then dried overnight in a dryer at 100° C. to produce a white-colored solid product.

Figure 6:
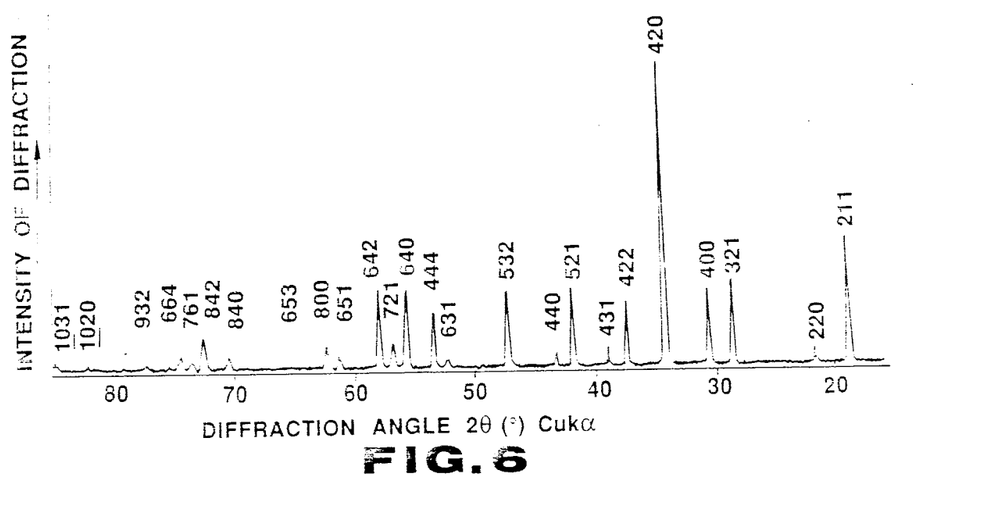
FIG. 6 is a diagram showing the X-ray diffraction pattern of the YAG base phosphor fine particles produced in accordance with the present invention.

This solid product was subjected to an X-ray analysis using CuK α rays. The results are shown in FIG. 6, in which the ordinate indicates the intensity of diffraction in arbitrary units and the abscissa the diffraction angle $2\theta(°)$. This X-ray diffraction pattern roughly coincided with the pattern of the cubic crystal YAG $(Y_3Al_5O_{12})$ indicated in the aforementioned JCPDS card 33–40.

When irradiated with the UV light having the wavelength of 254 to 366 nm, the white-colored product emitted green fluorescence. Also, on fluorescence X-ray analysis using a standard sample having the aforementioned composition of $Tb_xY_{3-x}Al_5O_{12}$ has revealed that the pattern coincided with that of the standard sample of x=0.15 and hence the aforementioned white-colored solid product had a composition of $Tb_{0.15}Y_{2.85}Al_5O_{12}$. The lattice constant calculated at this time on the basis of the X-ray diffraction peak was 12.025Å.

Figure 7:
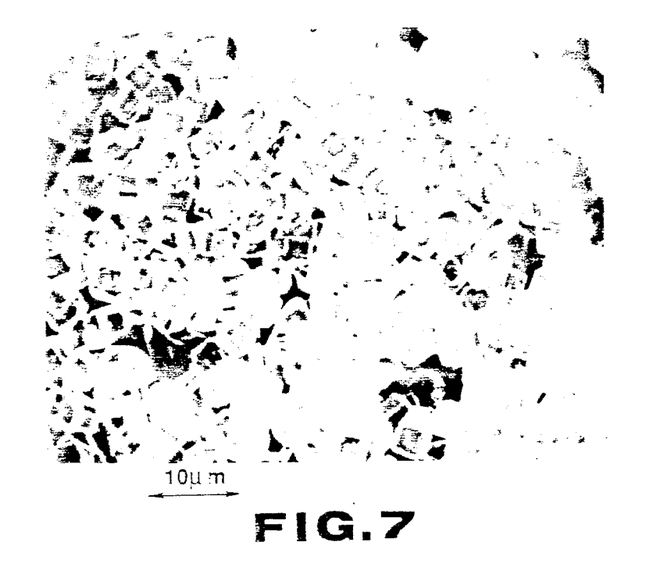
FIG. 7 is a photomicrograph taken with a scanning electron microscope of YAG base phosphor fine particles produced in accordance with the present invention.

FIG. 7 shows a photo of the white-colored solid product, taken with a scanning type electron microscope. It is seen that there have been produced YAG base phosphor fine particles having an extremely uniform particle size.

Then, for optimizing the conditions for producing the YAG base phosphor fine particles, investigations were made into changes of the pH value of the reaction solution, changes of the reaction temperature and changes of the reaction time interval, as in Example 1 above.

Figure 8:
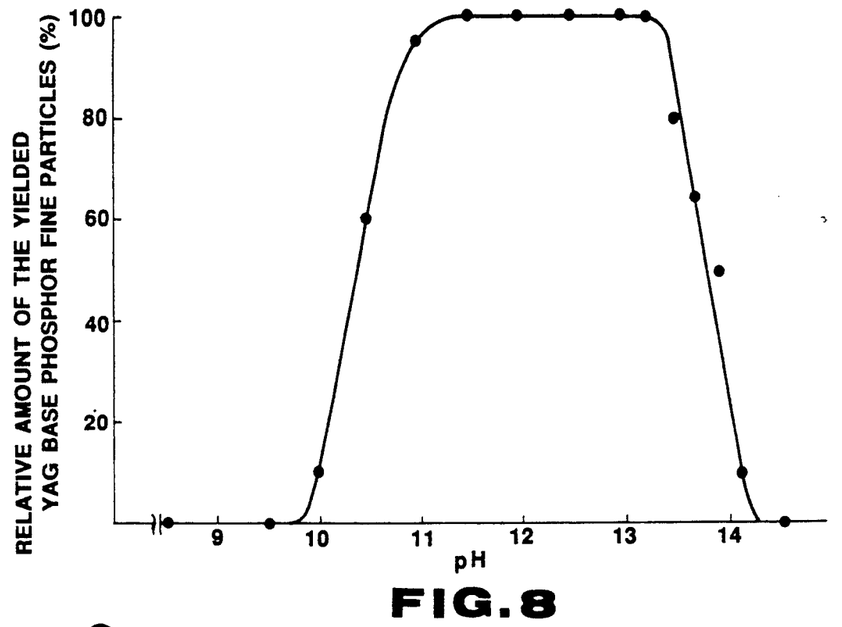
FIG. 8 is a diagram showing the amount of the yielded YAG base phosphor fine particles in relation to the pH of the solution.

The results of investigations into pH dependency are shown in FIG. 8, wherein the ordinate indicates the relative yield amount of the YAG base phosphor in percentage and the abscissa indicates the pH value of the reaction solution D. The reaction conditions are 374° C and one hour. It is seen from this Figure that the YAG base phosphor is produced in the pH range of 10.2 to 14.1 and is produced at a high yield rate in the pH range of 11.0 to 13.5.

Figure 9:
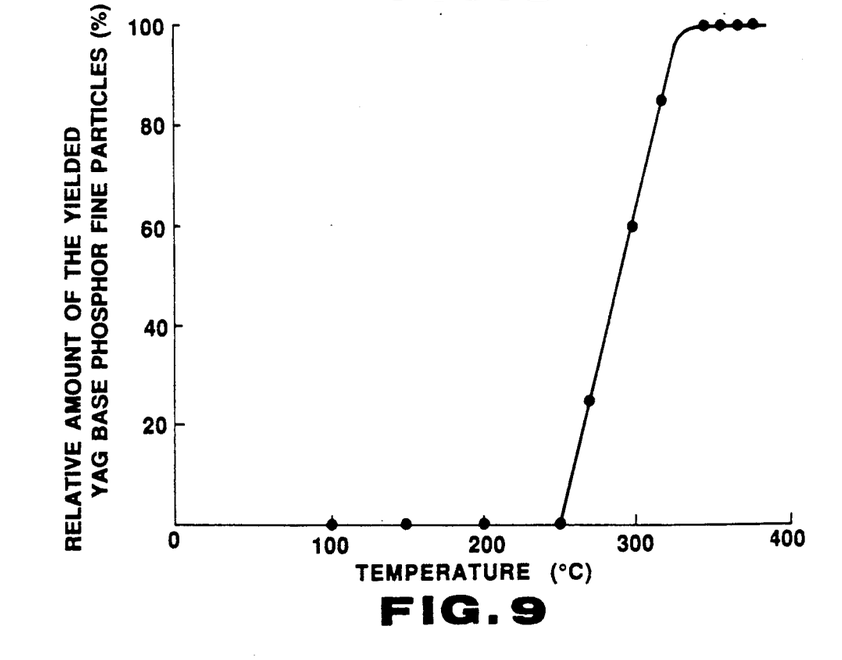
FIG. 9 is a diagram showing the amount of the yielded YAG base phosphor fine particles in relation to the reaction temperature.

The results of the investigations into the temperature dependency are shown in FIG. 9, wherein the ordinate shows the relative yield amount of the YAG base phosphor in percentage and the abscissa the reaction temperature in (°C.). The pH value of the reaction solution D is 12.5 and the reaction time interval is one hour. It is seen from this Figure that the YAG base phosphor is produced at a temperature of not lower than 275° C. and the reaction proceeds most efficiently at about 360° C. It is also seen that the temperature not higher than 250° C results in the increased peak of diffraction due to some other phase and, hence, is not suitable for synthesis.

Figure 10:
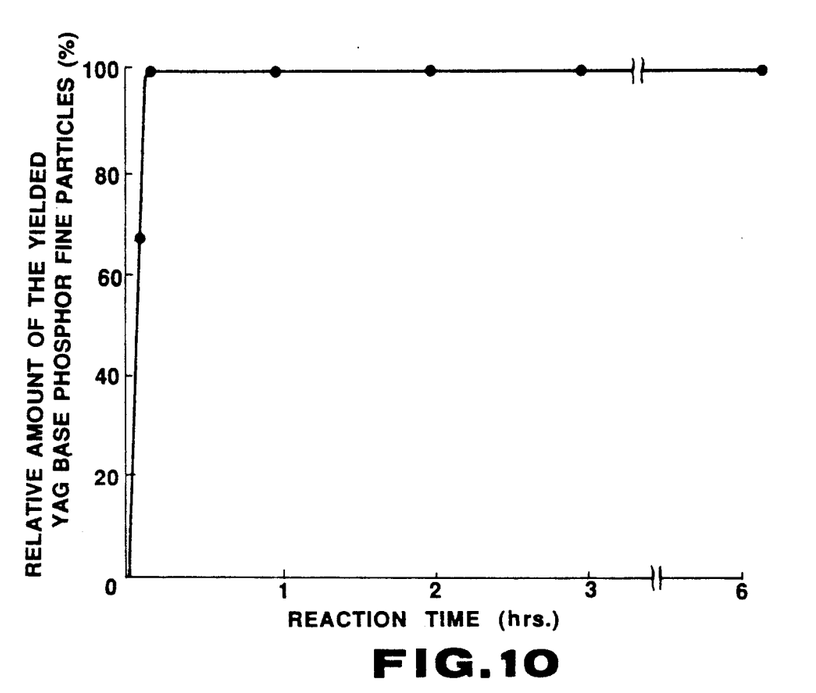
FIG. 10 is a diagram showing the amount of the yielded YAG base phosphor fine particles in relation to the reaction time interval.

Finally, the results of investigations into the different reaction time intervals are shown in FIG. 10, wherein the ordinate shows the relative yield amount of the YAG base phosphor in percentage and the abscissa the reaction time interval in hours. The pH value of the reaction solution is 12.5 and the reaction temperature is 374° C. It is seen from this Figure that the YAG base phosphor starts to be yielded in several minutes after the start of the reaction and reaches saturation in about ten minutes.

EXAMPLE 6

In the present Example, investigations have been made into the changes in the composition of the YAG base phosphor and in the lattice constant when the amounts of addition of yttrium nitrate, $Y(NO_3)_3 \cdot 3.5H_2O$, and terbium chloride, $TbCl_3$, in the reaction solution of Example 5 changes.

First, 12.04 g of aluminum chloride, $AlCl_3 \cdot 6H_2O$, and the amounts shown in Table 1 below of yttrium nitrate, $Y(NO_3)_3 \cdot 3.5H_2O$, and terbium chloride were added gradually into pure water containing a suitable amount of sodium hydroxide with agitation and pure water was finally added to the reaction system to give seven different 100 ml reaction solutions D.

Each reaction solution D was reacted in an autoclave with agitation at 374° C. for two hours. The white-colored solid products were obtained from the produced white-colored precipitates by the above described procedure of washing and then drying. An X-ray fluorescent analysis was performed of these white-colored solid products to determine the composition of each white-colored solid product. The results are shown in Table 1.

TABLE 1

| terbium chloride (g) | yttrium nitrate (g) | composition of solid products |
| --- | --- | --- |
| 0 | 12.67 | $Y_3Al_5O_{12}$ |
| 0.166 | 12.46 | $Tb_{0.05}Y_{2.95}Al_5O_{12}$ |
| 0.497 | 12.04 | $Tb_{0.15}Y_{2.85}Al_5O_{12}$ |
| 0.995 | 11.41 | $Tb_{0.3}Y_{2.7}Al_5O_{12}$ |
| 3.316 | 8.449 | $Tb_1Y_2Al_5O_{12}$ |
| 6.632 | 4.225 | $Tb_2Y_1Al_5O_{12}$ |
| 9.948 | 0 | $Tb_3Al_5O_{12}$ |

Figure 11:
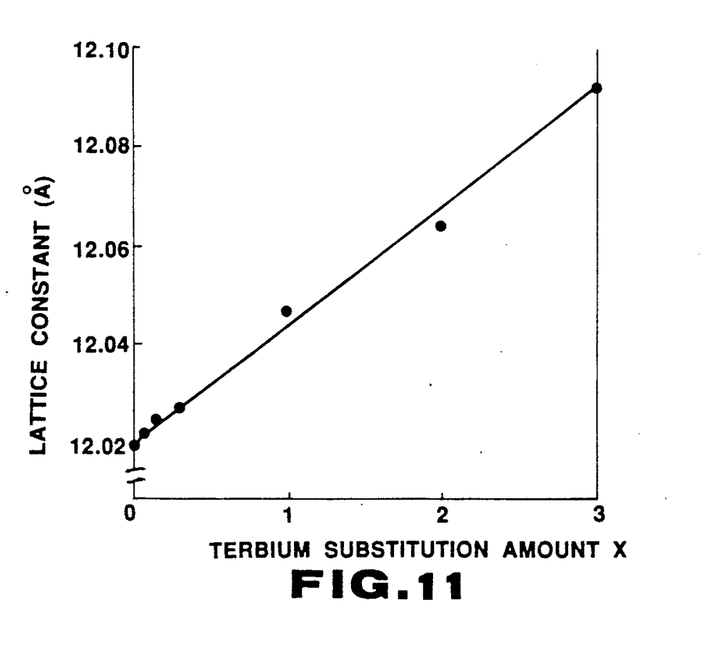
FIG. 11 is a diagram showing the lattice constant of the YAG base phosphor fine particles in relation to the amount of terbium substitution.

An X-ray diffraction analysis was performed of these YAG base phosphor fine particles $Tb_xY_{3-x}Al_5O_{12}$. It was found that each diffraction pattern was of the same phase as that shown in FIG. 6 but demonstrated a slight shift in the diffraction peak angle. The lattice constant was calculated on the basis of these diffraction peak angles and plotted against the amount of substitution of terbium x. The results are shown in FIG. 11, from which it is seen that a linear relationship exists between the amount of substitution of terbium x.

EXAMPLE 7

In the present Example, investigations were made into the changes in the composition of the YAG base phosphor fine particles due to changes in the amount of addition of aluminum in the above reaction solution D.

First, 2.485 g of terbium chloride, $TbCl_3$; 60.2 g of yttrium nitrite, $Y(NO_3)_3 \cdot 3.5H_2O$; and 75.3 g of aluminum chloride, $AlCl_3 \cdot 6H_2O$, were dissolved in 200 ml of pure water and the resulting solution was admixed with sodium hydroxide and thereby neutralized.

The resulting solution was divided into five equal parts into which aluminum chloride was added sequentially in amounts of 7.53 g, 15.1 g, ..., 37.7 g, thus, in amounts of 10%, 20%, ... 50% in excess to the initial amount of aluminum chloride. Finally, pure water was added to produce different 100 ml reaction solutions $D_1$ to $D_5$. The pH value of each of these reaction solutions $D_1$ to $D_5$ was adjusted to 13.3 with sodium hydroxide.

The above reaction solutions $D_1$ to $D_5$ were reacted at 360° C. for one hour with agitation in an autoclave. The white-colored solid products were obtained from the precipitates by the processes described above. These white-colored solid products were analyzed by an X-ray diffraction, from which it was seen that the diffraction pattern of each of the white-colored solid products obtained from the reaction solutions $D_3$ to $D_5$ was about the same as that shown in FIG. 6 but each of the white-colored solid products obtained from the reaction solutions $D_1$ and $D_2$ also contained small amounts of yttrium hydroxide, $Y(OH)_3$. From this it is seen that the amount of aluminum corresponding to at least 2.3 times of mols of yttrium is required to suppress the formation of yttrium hydroxide, $Y(OH)_3$, in the reaction in the aqueous alkaline solution.

EXAMPLE 8

In the present Example, investigations were made into changes in the particle size of the YAG base phosphor by changes in the pH of the reaction solution D.

First, 3.48 g of terbium chloride, 84.3 g of yttrium nitrate, $Y(NO_3)_3 \cdot 3.5H_2O$, and 153.3 g of aluminum chloride, $AlCl_3 \cdot 6H_2O$, were dissolved in 350 ml of pure water and the resulting solution was neutralized with sodium hydroxide.

This solution was divided into seven equal parts and each of the parts had a predetermined amount of sodium hydroxide and pure water added to give seven 100 ml solutions with different pH values. Thus, the reaction solutions $D_6$ to $D_{12}$ having the pH values shown in Table 2 below were prepared.

Each of these reaction solutions $D_6$ to $D_{12}$ was reacted in an autoclave at 374° C for one hour with agitation. White-colored solid products were produced from the precipitates by the above-described procedure. These white-colored solid products were analyzed by X-ray diffraction and found to be the YAG base phosphor of different peak strengths but the same phase.

These white-colored solid products were observed with a scanning type electron microscope. It was, thus, found that the YAG base phosphor having the particle size of 0.2 to 5µm was produced by change in the pH value. The results are shown in Table 2.

TABLE 2

| reaction solutions | pH | particle size(µm) | reaction solutions | pH | particle size(µm) |
| --- | --- | --- | --- | --- | --- |
| $D_6$ | 12.6 | 0.2 | $D_{10}$ | 13.7 | 3-5 |
| $D_7$ | 12.9 | 0.5-1 | $D_{11}$ | 13.9 | 2-3 |
| $D_8$ | 13.3 | 2-3 | $D_{12}$ | 14.1 | 1-2 |
| $D_9$ | 13.5 | 3-5 | | | |

Thus, it is seen that the particle size of the produced YAG base phosphor fine particles can be controlled by the pH of the reaction solution D.

Although various minor modifications may be suggested by those versed in the art, it should be understood that we wish to embody within the scope of the patent granted hereon all such modifications as reasonably and properly come within the scope of our contribution to the art.

We claim:

1. A method for producing yttrium-aluminum-garnet fine particles having a formula of $Y_3Al_5O_{12}$, said method comprising reacting in an autoclave at a reaction temperature of not less than 270° C. a first material selected from a group consisting of yttrium salts and hydrolyzates of yttrium compounds and a second material selected from a group consisting of aluminum salts and hydrolyzates of aluminum compounds, said first material and said second material being solubilized in an aqueous alkaline solution having a pH value of not less than 10.0.

2. A method according to claim 1, wherein the pH value of said aqueous alkaline solution is in a range of 10.0 to 13.3.

3. A method according to claim 1, wherein the pH value of said aqueous alkaline solution is in a range of 11.0 to 12.6.

4. A method according to claim 1, wherein said reaction temperature is in a range of 300° C. to 380° C.

5. A method according to claim 1, wherein the amount of aluminum in said aqueous alkaline solution is not less than 30% in excess of the stoichiometric amount with respect to the yttrium, necessary to form said yttrium-aluminum-garnet fine particles.

6. A method according to claim 5, wherein the pH value of said aqueous solution is in a range of 10.0 to 13.3, and said reaction temperature being in a range of 300° C. to 380° C.

7. A method for producing yttrium-aluminum-garnet base phosphor fine particles having a formula of $Y_{3-x}Tb_xAl_5O_{12}$, $0<x<3$, said method comprising reacting in an autoclave at a reaction temperature of not less than 270° C. a first material selected from a group consisting of yttrium salts and hydrolyzates of yttrium compounds, a second material selected from a group consisting of aluminum salts and hydrolyzates of aluminum compounds, and a third material selected from a group consisting of terbium salts and hydrolyzates of terbium compounds, said first, second and third materials being solubized in an aqueous alkaline solution having a pH value of not less than 10.0.

8. A method according to claim 7, wherein the pH value of said aqueous alkaline solution is in a range of 10.2 to 14.1.

9. A method according to claim 7, wherein the pH value of said aqueous alkaline solution is in a range of 11.0 to 13.5.

10. A method according to claim 7, wherein said reaction temperature is in a range of 300° C. to 380° C.

11. A method according to claim 10, wherein the pH value of said aqueous alkaline solution is in a range of 10.2 to 14.1.

* * * * *